US009569765B2

(12) United States Patent
Cancro et al.

(10) Patent No.: US 9,569,765 B2
(45) Date of Patent: Feb. 14, 2017

(54) SIMULTANEOUS ITEM SCANNING IN A POS SYSTEM

(71) Applicant: Wal-Mart Stores, Inc., Bentonville, AR (US)

(72) Inventors: Richard Neil Cancro, Portland, OR (US); Joel Bennett Acker, Jr., Brush Prairie, WA (US); Douglas James Pedley, Portland, OR (US)

(73) Assignee: WAL-MART STORES, INC., Bentonville, AR (US)

( * ) Notice: Subject to any disclaimer, the term of this patent is extended or adjusted under 35 U.S.C. 154(b) by 183 days.

(21) Appl. No.: 14/473,826

(22) Filed: Aug. 29, 2014

(65) Prior Publication Data
US 2016/0063755 A1 Mar. 3, 2016

(51) Int. Cl.
G06T 15/08 (2011.01)
G06Q 20/20 (2012.01)
G07G 1/00 (2006.01)

(52) U.S. Cl.
CPC .......... G06Q 20/208 (2013.01); G07G 1/0036 (2013.01)

(58) Field of Classification Search
USPC ........................................................ 345/424
See application file for complete search history.

(56) References Cited

U.S. PATENT DOCUMENTS

| 5,083,638 A * | 1/1992 | Schneider | A47F 9/048 177/25.15 |
| 5,729,697 A | 3/1998 | Schkolnick | |
| 5,883,968 A * | 3/1999 | Welch | A47F 9/045 382/100 |
| 6,484,939 B1 | 11/2002 | Blaeuer | |
| 6,659,344 B2 | 12/2003 | Otto | |
| 6,659,346 B1 | 12/2003 | Williams | |
| 6,910,697 B2 | 6/2005 | Varatharajah | |
| 6,954,735 B1 | 10/2005 | Djupsjöbacka | |
| 7,225,980 B2 | 6/2007 | Ku | |
| 7,934,647 B1 | 5/2011 | Mims | |
| 8,145,295 B2 * | 3/2012 | Boyden | A61B 5/0071 600/476 |
| 8,648,699 B2 | 2/2014 | Iasella | |
| 8,678,281 B2 | 3/2014 | Kangas | |
| 2004/0065732 A1 | 4/2004 | Bernds | |
| 2004/0125103 A1 * | 7/2004 | Kaufman | G06T 15/005 345/419 |

(Continued)

FOREIGN PATENT DOCUMENTS

| EP | 2667361 A2 | 11/2013 |
| WO | WO0073971 A1 | 12/2000 |
| WO | WO2012093800 A2 | 7/2012 |

Primary Examiner — Kimbinh T Nguyen
(74) Attorney, Agent, or Firm — Howard & Howard Attorneys PLLC

(57) ABSTRACT

A plurality of items is positioned in a volume scanned by a three-dimensional non-optical imaging system. The imaging system generates a three-dimensional voxel image of the volume. Voxel regions are identified and surfaces of voxel regions are analyzed to identify a symbol printed thereon. The symbols are resolved into product identifiers, which are then added to a transaction and payment for the transaction is processed. The imaging system may be a magnetic resonance imaging (MRI) system, computed tomography (CT) scanning system, terahertz (T wave) imaging system, or other imaging system.

20 Claims, 6 Drawing Sheets

(56) References Cited

U.S. PATENT DOCUMENTS

| | | | |
|---|---|---|---|
| 2006/0202989 A1* | 9/2006 | Yinghui | G06T 15/08 345/424 |
| 2006/0289637 A1 | 12/2006 | Brice | |
| 2007/0018975 A1* | 1/2007 | Chuanggui | A61B 90/36 345/419 |
| 2008/0110992 A1* | 5/2008 | Knowles | A47F 9/046 235/462.14 |
| 2009/0134221 A1* | 5/2009 | Zhu | A47F 9/046 235/383 |
| 2009/0322481 A1 | 12/2009 | Marr, III | |
| 2011/0063288 A1* | 3/2011 | Valadez | G06T 15/08 345/419 |
| 2012/0136242 A1* | 5/2012 | Qi | A61B 5/026 600/424 |
| 2013/0215116 A1* | 8/2013 | Siddique | G06Q 30/0643 345/420 |
| 2013/0223673 A1 | 8/2013 | Davis | |
| 2014/0081738 A1* | 3/2014 | Abraham | G07G 1/14 705/14.38 |
| 2014/0164174 A1 | 6/2014 | Kitlyar | |
| 2014/0164175 A1 | 6/2014 | Kitlyar | |
| 2014/0288426 A1* | 9/2014 | Ebisawa | G01S 15/895 600/438 |
| 2015/0112790 A1* | 4/2015 | Wolinsky | G06Q 30/0238 705/14.38 |
| 2015/0123970 A1* | 5/2015 | Gyger | G06T 5/002 345/424 |

* cited by examiner

SIMULTANEOUS ITEM SCANNING IN A POS SYSTEM

BACKGROUND

Field of the Invention

This invention relates to systems and methods for inputting items to a point of sale (POS) device.

Background of the Invention

Retailers constantly strive to draw shoppers into the store and persuade them to make as many purchases as possible. However, a large retailer may alienate customers when large delays at checkout cause annoyance. Typically, checkout involves the customer or a cashier scanning each item to add it to a transaction. Payment is tendered and the transaction is concluded. This individual scanning of items is the principal cause of delays at checkout. Some attempts have been made to enable the customer to scan items as they are retrieved. However, this approach relies on the trustworthiness of the customer and may still require a cashier to verify that a list of items alleged to have been scanned by the customer corresponds to the items in a customer's cart.

The systems and methods described herein provide an improved approach scanning items at checkout in order to significantly reduce delays due to scanning of items.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
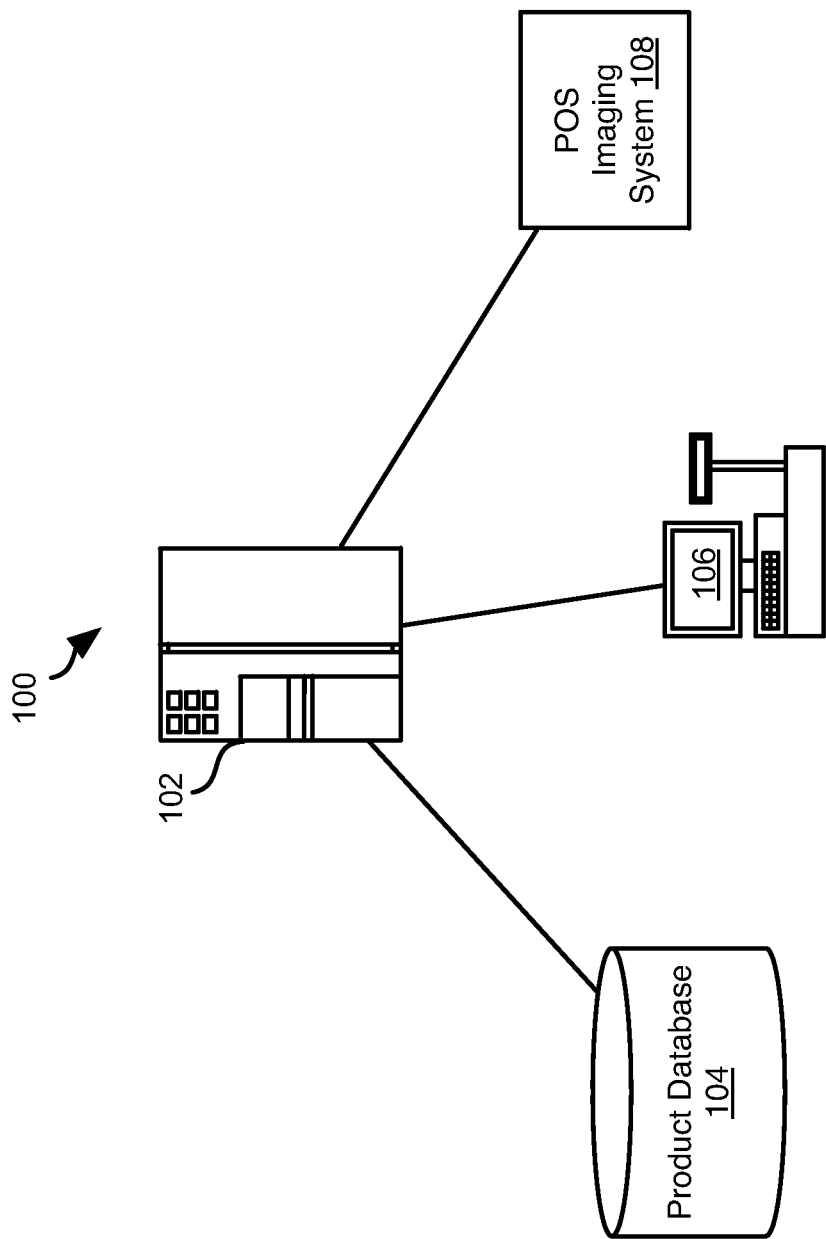
FIG. 1 is a schematic block diagram of a network environment suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. In particular, a plurality of items is positioned in a volume scanned by a three-dimensional non-optical imaging system. The imaging system generates a three-dimensional voxel image of the volume. Voxel regions are identified and surfaces of voxel regions are analyzed to identify a symbol printed thereon. The symbols are resolved into product identifiers, which are then added to a transaction and payment for the transaction is processed.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 in which the systems and methods disclosed herein may be implemented. For example, a server system 102 may host product database 104 that stores product records for a plurality of products. Each product record may store one or more identifiers of a product represented by the product record and may map a symbol or code (e.g. a universal product code UPC) to the product. The product record may include a textual name of the corresponding product, e.g. a product name as printed on the product or packaging of the product.

The server system 102 may be operably coupled to a point of sale (POS) 106 that is a computer system operable to receive tender of payment or verification of payment for a transaction including a list of items. The POS 106 may be operable to receive scanning of codes on products or product packaging and may include a scanning device, such as a laser scanner or other scanning or input device.

A POS imaging system 108 is operably coupled to one or both of the server system 102 and POS 106 and may include a non-optical imaging system that is able to image a volume, i.e. capable of characterizing material properties at an arbitrary point within the volume without regard to intervening material between the arbitrary point and a radiation source and a receptor. For example, the POS imaging system 108 may be a magnetic resonance imaging (MRI) system, computed tomography (CT) scanning system, terahertz (T wave) imaging system, or other imaging system.

Figure 2A:
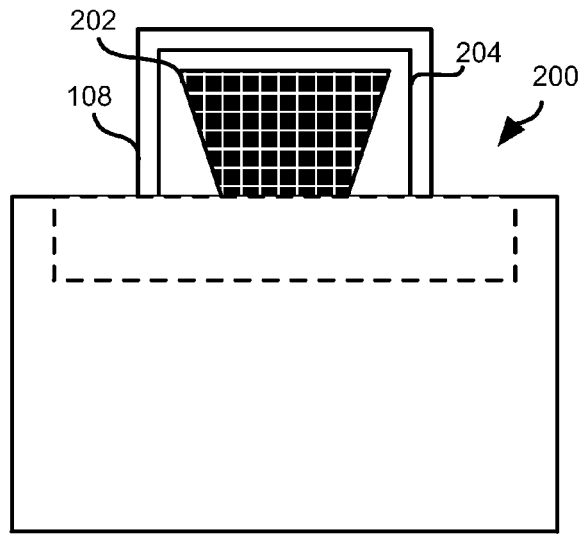
FIGS. 2A and 2B are schematic diagrams of POS station including a non-optical three-dimensional imaging system in accordance with an embodiment of the present invention.
Figure 2B:
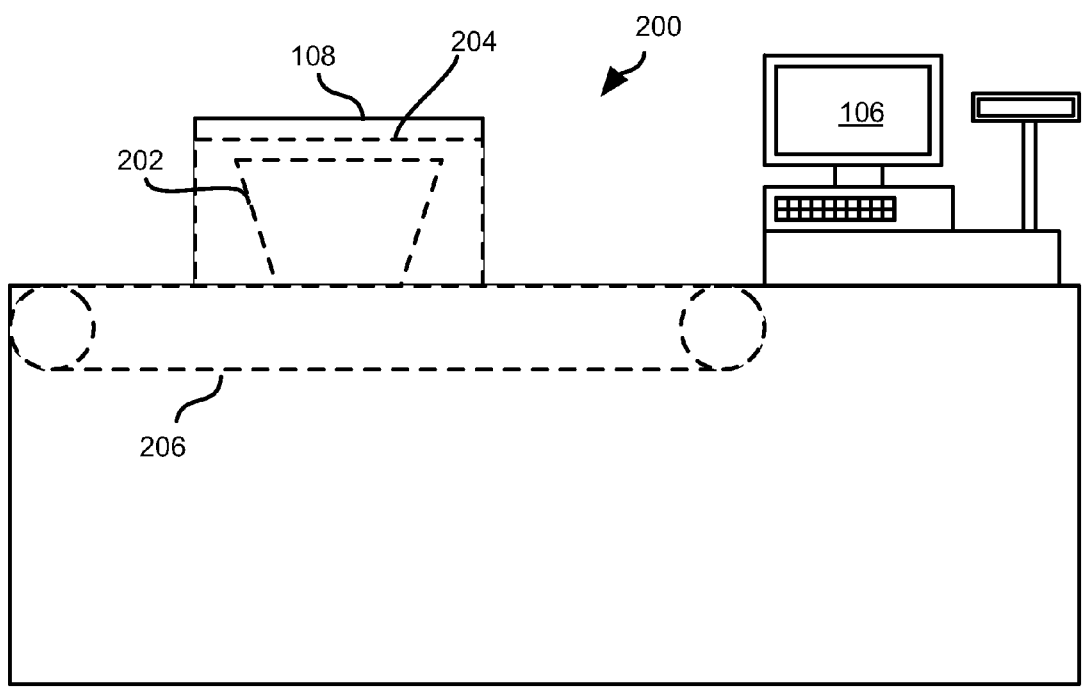

Referring to FIGS. 2A and 2B, a POS station 200 may include the imaging system 108 defining a cavity 204 or volume that is imaged by the imaging system 108. The cavity 204 may be a tunnel having inlet and outlet ends. For example, a conveyor belt 206 or other actuator may transport a basket 202 containing products through the cavity 204 and may pause when the basket 202 is within the scanner in order to enable imaging to occur. Alternatively, products may be placed directly on the conveyor belt 206 and conveyed into the cavity 204. Alternatively, a basket 202 or other receptacle or products without a receptacle may simply be placed in the cavity 204, scanned, and then manually removed upon completion of scanning.

Figure 3:
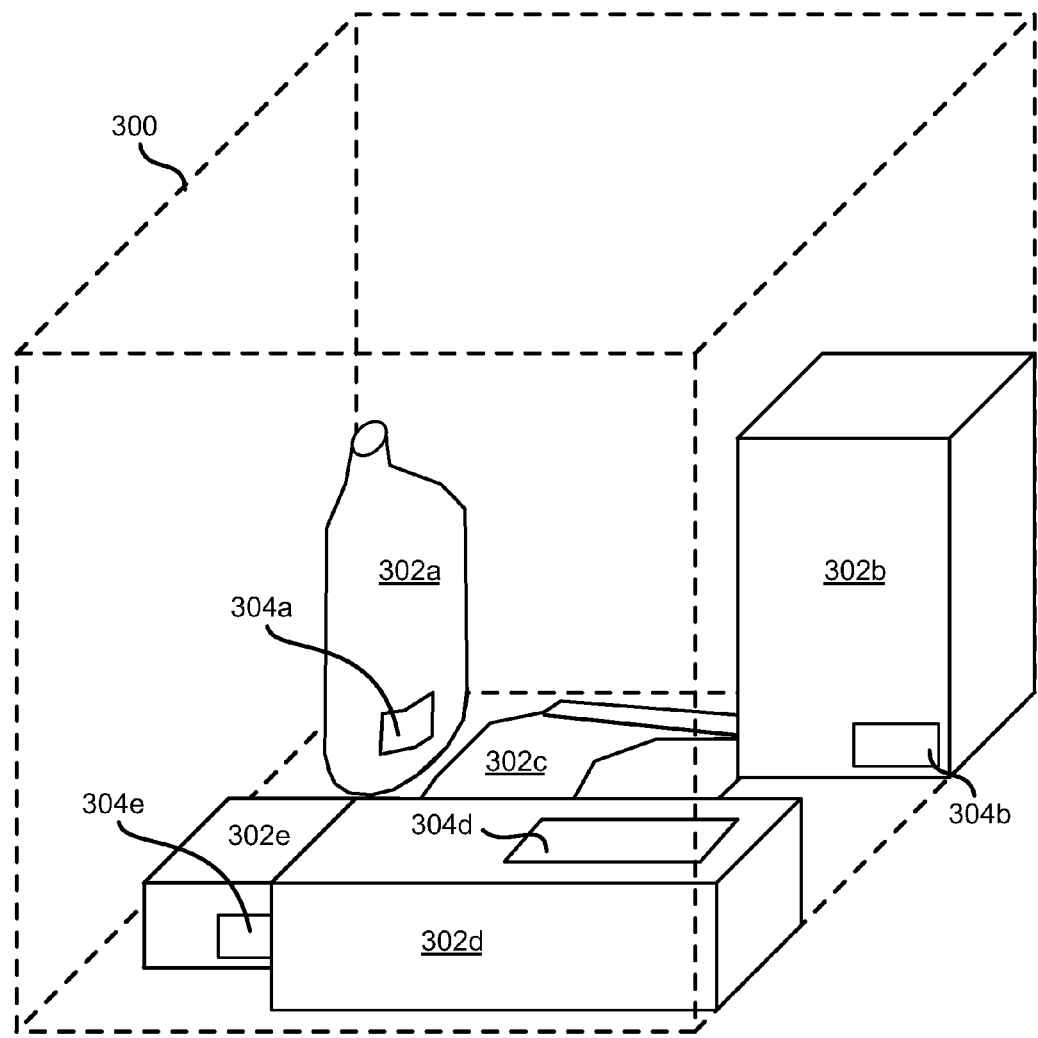
FIG. 3 is a example representation of a three-dimensional image of a volume including a plurality of products in accordance with an embodiment of the present invention.

Referring to FIG. 3, an output of the imaging system 108 may be a voxel space 300 such that each point within the volume is represented by a voxel (volumetric pixel) representing detected material properties at that point in the volume. Volumetric properties may include any detectable property, such as density, response to a magnetic excitation, transparency for a particular type of nuclear or electromagnetic radiation, or some other material property that can cause a perceptible change in response according to any of the imaging modalities recited above.

Figure 4:
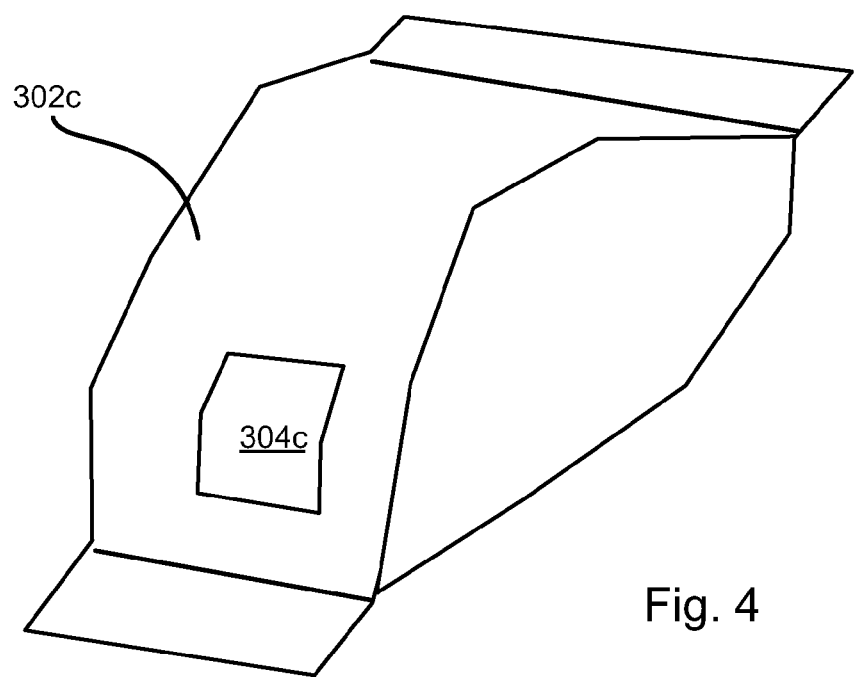
FIG. 4 is an example representation of a voxel region corresponding to a product in accordance with an embodiment of the present invention.

As shown in FIG. 3, regions 302a-302e of the voxel space may correspond to products positioned within the cavity 204. The regions 302a-302e may be distinguishable within the voxel space 300 due to different properties from each other and from the surrounding air as detected according to the imaging modality used. The regions 302a-302e may include voxels representing regions 304a-304e at which symbols or labels affixed to a product or product packaging are located (region 304c is not visible in FIG. 3 but rather is shown in FIG. 4). The symbols may be optical symbols such as universal product codes (UPC), textual labels (e.g. a product name), or some other type of symbol. The symbols may be printed using ink or other material that differs from that of the material on which it is printed in a manner perceptible by the imaging modality implemented by the imaging system 208.

Figure 5:
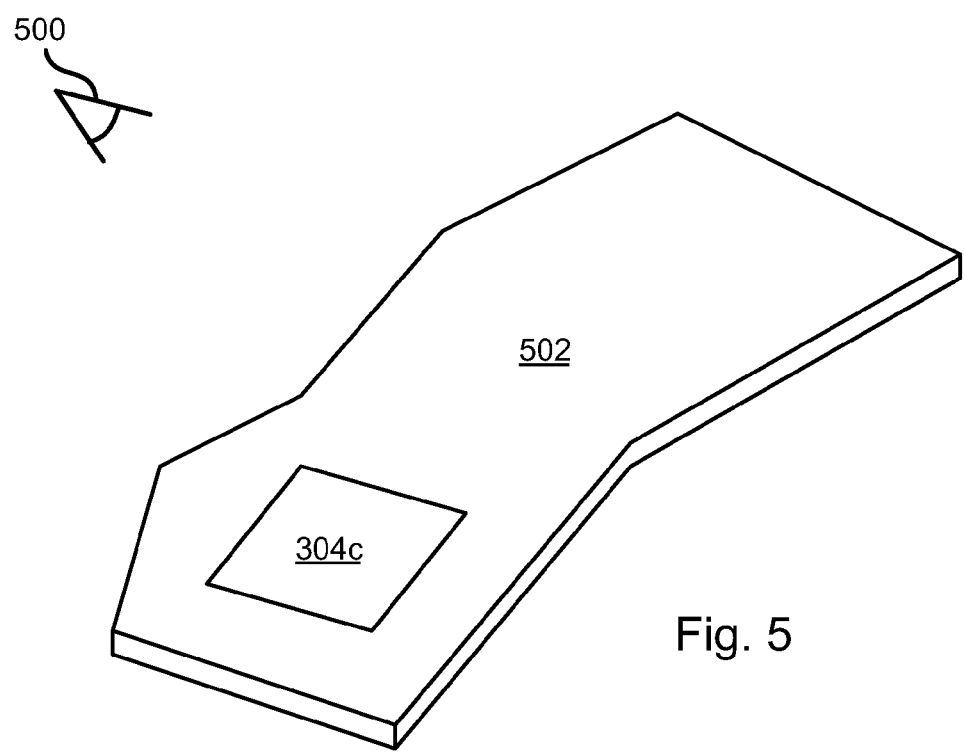
FIG. 5 is an example representation of a surface of a voxel region bearing a symbol in accordance with an embodiment of the present invention.

Referring to FIGS. 4 and 5, each region 302a-302d may be analyzed separately in order to identify the portion 304a-304d corresponding to the identifying symbol. For example, the surface of the illustrated region 302c may be analyzed by generating an image of the region 302c from a view point 500 viewing a portion 502 of the region 302c. The image as seen from the viewpoint 500 may include the region 304c including the symbol and image processing may be used to identify the region 304c. In some embodiments, the voxels of the surface of the region 302c may be mapped to a two-dimensional surface and the voxels may be analyzed to identify the region 304c. For example, a contoured surface of the region 302c may be virtually unwrapped of flattened as one might physically flatten a wrinkled or bent sheet of material.

Figure 6:
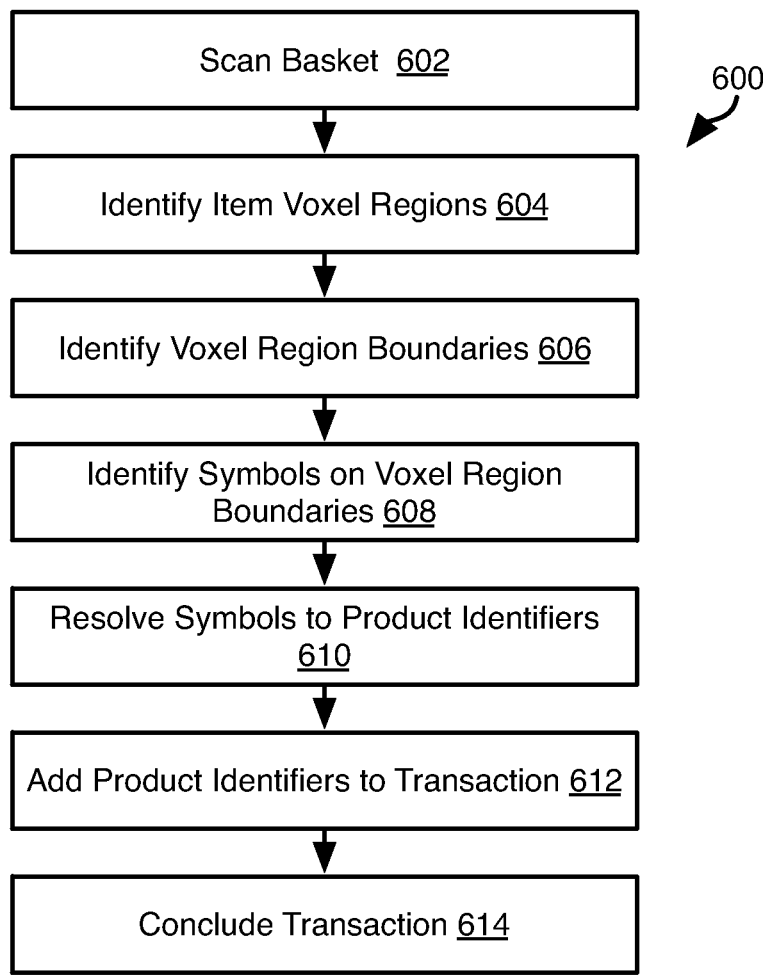
FIG. 6 is a process flow diagram of a method for scanning a plurality of products using a non-optical three-dimensional imaging system in accordance with an embodiment of the present invention.

Referring to FIG. 6, the illustrated method 600 may be used to simultaneously scan a plurality of items in order to add them to a transaction. The processing of the method 600 may be performed exclusively on a POS 106 or may be distributed between the POS 106 and the system 102 in order to take advantage of additional processing power of the server system 102.

The method 600 may include scanning 602 a basket containing one or more products and positioned within an imaging cavity 204 or otherwise positioned within a field of view of the imaging system 108. Products may also be scanned 602 without being positioned within a receptacle. However, one advantage of the methods described herein is the ability to scan items in a basket without requiring a customer to individually transfer items to scan them. A result of the scanning 602 may be a voxel space 300 as described above. In some embodiments, the scanning step 602 may include scanning a volume using two or more of the above-described imaging modalities.

The method 600 may include identifying 604 voxel regions within the voxel space. In particular, voxel regions may be identified according to contrasting properties from air surrounding a product and the properties of the product. Continuous surfaces of constant properties may also be identified in order to determine the boundaries of a region that may indicate the surface of a product. The method by which voxel regions are identified may include any image processing technique known in the art and may employ any technique known in the medical field by which organs or different tissues in an organism are identified using some or all of the imaging modalities described above. Where multiple imaging modalities are used, contrasting properties according to both imaging modalities may be used to identify the outer surface of regions corresponding to products with greater confidence, such as using any multi-spectral imaging technique known in the art.

The method 600 may include, for each voxel region, identifying 606 boundaries of the voxel regions and identifying 608 symbols on the surface of the voxel region. As noted above, images of a three-dimensional voxel region boundary may be obtained from various viewpoints. These images may then be analyzed to identify UPC bar codes, text, or other identifying information. The methods by which symbols are identified from image data may include using any image processing method known in the art.

The method 600 may include resolving 610 the identified symbols 608 to product identifiers. For example, where a UPC bar code is identified, the UPC may be mapped to a particular product record and a product identifier, price, and/or other information may be retrieved for that product record and used to populate a transaction record.

The product identifiers obtained at step 610 may be added 612 to a transaction. This may include adding the product identifiers and prices to a record of the pending transaction generated on the POS 106. Where the processing of the voxel data according to steps 608-610 occurs on the system 102, the server system may transmit identifier and price information to the POS 106, which then adds this data to a transaction record for a pending transaction. The transaction may then be concluded 614, such as by receiving tender of payment at the POS 106, processing electronic payment at the POS 106, and like steps. Notification of the transaction record and of tender of payment may be transmitted by the POS 106 to the server system 102.

Various other implementations of the method 600 may also be used. For example, products or product packaging may have affixed thereto radio frequency identification (RFID) tags. Accordingly, scanning 602 the basket may include activating the RFID tags and detecting broadcast identifiers from the RFID tags as known in the art. These broadcast identifiers may then be resolved 610 to product identifiers, such as using a database mapping the broadcast identifiers to particular product records. The method 600 may then continue in the same manner with respect to the identified product identifiers as described above with respect to steps 612 and 614.

Figure 7:
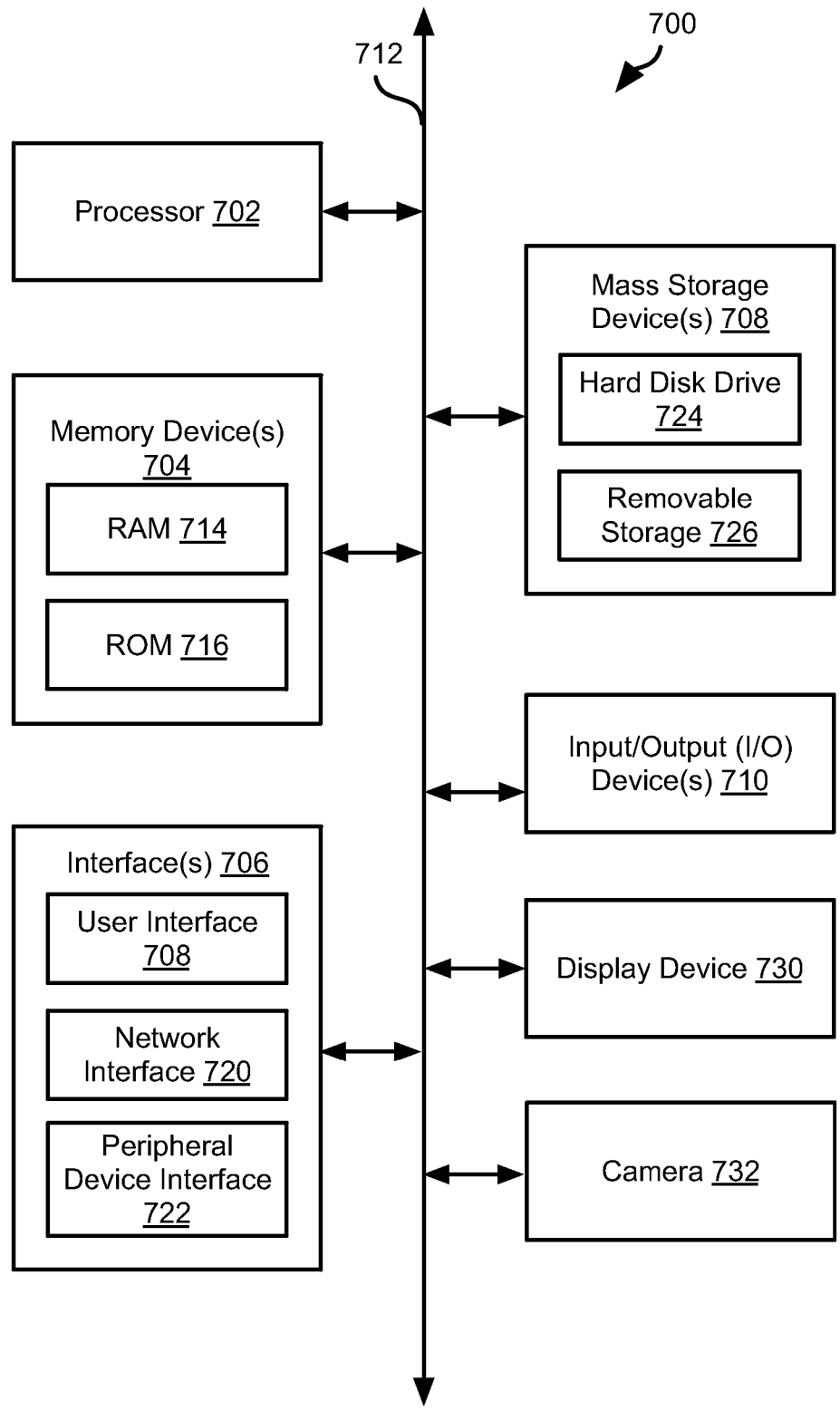
FIG. 7 is a schematic block diagram of a computer system suitable for implementing methods in accordance with embodiments of the present invention.

FIG. 7 is a block diagram illustrating an example computing device 700. Computing device 700 may be used to perform various procedures, such as those discussed herein. Computing device 700 can function as a server, a client, or any other computing entity, including any of the server system 102, POS 110, and POS imaging system 108. Computing device can perform various monitoring functions as discussed herein, and can execute one or more application programs, such as the application programs described herein. Computing device 700 can be any of a wide variety of computing devices, such as a desktop computer, a notebook computer, a server computer, a handheld computer, tablet computer and the like.

Computing device 700 includes one or more processor(s) 702, one or more memory device(s) 704, one or more interface(s) 706, one or more mass storage device(s) 708, one or more Input/Output (I/O) device(s) 710, a display device 730, and a camera 732 all of which are coupled to a bus 712. Processor(s) 702 include one or more processors or controllers that execute instructions stored in memory device(s) 704 and/or mass storage device(s) 708. Processor(s) 702 may also include various types of computer-readable media, such as cache memory.

Memory device(s) 704 include various computer-readable media, such as volatile memory (e.g., random access memory (RAM) 714) and/or nonvolatile memory (e.g., read-only memory (ROM) 716). Memory device(s) 704 may also include rewritable ROM, such as Flash memory.

Mass storage device(s) 708 include various computer readable media, such as magnetic tapes, magnetic disks, optical disks, solid-state memory (e.g., Flash memory), and so forth. As shown in FIG. 7, a particular mass storage device is a hard disk drive 724. Various drives may also be included in mass storage device(s) 708 to enable reading from and/or writing to the various computer readable media. Mass storage device(s) 708 include removable media 726 and/or non-removable media.

I/O device(s) 710 include various devices that allow data and/or other information to be input to or retrieved from computing device 700. Example I/O device(s) 710 include cursor control devices, keyboards, keypads, microphones, monitors or other display devices, speakers, printers, network interface cards, modems, lenses, CCDs or other image capture devices, and the like.

Display device 730 includes any type of device capable of displaying information to one or more users of computing device 700. Examples of display device 730 include a monitor, display terminal, video projection device, and the like.

Interface(s) 706 include various interfaces that allow computing device 700 to interact with other systems, devices, or computing environments. Example interface(s) 706 include any number of different network interfaces 720, such as interfaces to local area networks (LANs), wide area networks (WANs), wireless networks, and the Internet. Other interface(s) include user interface 718 and peripheral device interface 722. The interface(s) 706 may also include one or more user interface elements 718. The interface(s) 706 may also include one or more peripheral interfaces such as interfaces for printers, pointing devices (mice, track pad, etc.), keyboards, and the like.

Bus 712 allows processor(s) 702, memory device(s) 704, interface(s) 706, mass storage device(s) 708, and I/O device(s) 710 to communicate with one another, as well as other devices or components coupled to bus 712. Bus 712 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 700, and are executed by processor(s) 702. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
   providing a point of sale system for processing a retail transaction for a plurality of retail products;
   providing a non-optical three-dimensional imaging system coupled to the point of sale system, the imaging system comprising at least one of a magnetic resonance imager (MRI) system, a computed tomography (CT) scanning system, and a terahertz imaging system;
   scanning, by the non-optical three-dimensional imaging system a volume occupied by the plurality of retail products to obtain a three dimensional voxel image of the volume;
   processing, by a computer system, the three dimensional voxel image to identify three-dimensional voxel regions, each three-dimensional voxel region corresponding to a product of the plurality of retail products;
   identifying, by the computer system, for each three-dimensional voxel region, a symbol on a surface of the each three-dimensional voxel region;
   identifying, by the computer system, for each three-dimensional voxel region, a product identifier corresponding to the symbol on the surface of the each three-dimensional voxel region;
   adding, by the point of sale system, the product identifiers for each three dimensional voxel region to the retail transaction; and
   processing, by the point of sale system, payment for the retail transaction.

2. The method of claim 1, wherein the non-optical three-dimensional imaging system comprises a magnetic resonance imager (MRI) system.

3. The method of claim 1, wherein the non-optical three-dimensional imaging system comprises a computed tomography (CT) scanning system.

4. The method of claim 1, wherein the non-optical three-dimensional imaging system comprises a terahertz imaging system.

5. The method of claim 1, wherein the non-optical three-dimensional imaging system comprises two or more of:
   a magnetic resonance imager (MRI) system;
   a computed tomography (CT) scanning system; and
   a terahertz imaging system.

6. The method of claim 1, wherein the symbol on the surface of the each three-dimensional voxel region comprises an optical code.

7. The method of claim 1, wherein the symbol on the surface of the each three-dimensional voxel region comprises a universal product code.

8. The method of claim 1, wherein the symbol on the surface of the each three-dimensional voxel region comprises a textual product name.

9. The method of claim 1, further comprising moving a receptacle containing the plurality of products through the non-optical three-dimensional imaging system.

10. The method of claim 1, further comprising moving a receptacle containing the plurality of products through the non-optical three-dimensional imaging system on a conveyor belt.

11. A system comprising:
    a point of sale system for processing a retail transaction for one or more retail products;
    a non-optical three-dimensional imaging system coupled to the point of sale system, the non-optical three-dimensional imaging system having in a viewable area thereof a volume, wherein the non-optical three-dimensional imaging system comprises at least one of a magnetic resonance imager (MRI) system, a computed tomography (CT) scanning system, and a terahertz imaging system; and
    a computer system, coupled to the non-optical three-dimensional imaging system and operable to receive a three dimensional voxel image of the one or more retail products within the volume from the non-optical three-dimensional imaging system, the computer system further programmed to:
       process the three dimensional voxel image to identify three-dimensional voxel regions;
       identify for each three-dimensional voxel region, a symbol on a surface of the each three-dimensional voxel region; and
       identify, for each three-dimensional voxel region, a product identifier corresponding to the symbol on the surface of the each three-dimensional voxel region,
    wherein the point of sale system is configured to:
       add the product identifiers for each three dimensional voxel region to the retail transaction; and
       process payment for the retail transaction.

12. The system of claim 11, wherein the non-optical three-dimensional imaging system comprises a magnetic resonance imager (MRI) system.

13. The system of claim 11, wherein the non-optical three-dimensional imaging system comprises a computed tomography (CT) scanning system.

14. The system of claim 11, wherein the non-optical three-dimensional imaging system comprises a terahertz imaging system.

15. The system of claim 11, wherein the non-optical three-dimensional imaging system comprises two or more of:
   a magnetic resonance imager (MRI) system;
   a computed tomography (CT) scanning system; and
   a terahertz imaging system.

16. The system of claim 11, wherein the symbol on the surface of the each three-dimensional voxel region comprises an optical code.

17. The system of claim 11, wherein the symbol on the surface of the each three-dimensional voxel region comprises a universal product code.

18. The system of claim 11, wherein the symbol on the surface of the each three-dimensional voxel region comprises a textual product name.

19. The system of claim 11, further comprising an actuator moving a receptacle through the non-optical three-dimensional imaging system.

20. The system of claim 19, wherein the actuator is a conveyor belt.

\* \* \* \* \*